(12) United States Patent
Yang et al.

(10) Patent No.: US 7,105,588 B2
(45) Date of Patent: Sep. 12, 2006

(54) SCREEN PRINTABLE HYDROGEL FOR MEDICAL APPLICATIONS

(75) Inventors: Haixin Yang, Chapel Hill, NC (US); Lisa Marie Runge, Raleigh, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 404 days.

(21) Appl. No.: 10/683,530

(22) Filed: Oct. 10, 2003

(65) Prior Publication Data

US 2005/0080186 A1    Apr. 14, 2005

(51) Int. Cl.
*C08L 29/04*    (2006.01)
*C08L 1/10*    (2006.01)
*C08K 3/36*    (2006.01)

(52) U.S. Cl. .................. 524/37; 524/457; 524/803; 524/916

(58) Field of Classification Search .................. 524/37, 524/457, 803, 916
See application file for complete search history.

(56) References Cited

U.S. PATENT DOCUMENTS

| | | | |
|---|---|---|---|
| 2,760,863 A | 8/1956 | Plambeck, Jr. | |
| 2,850,445 A | 9/1958 | Oster | |
| 2,875,047 A | 2/1959 | Oster | |
| 2,927,022 A | 3/1960 | Martin et al. | |
| 3,074,974 A | 1/1963 | Gebura | |
| 3,097,096 A | 7/1963 | Oster | |
| 3,097,097 A | 7/1963 | Oster et al. | |
| 3,145,104 A | 8/1964 | Oster et al. | |
| 3,380,831 A | 4/1968 | Cohen et al. | |
| 3,427,161 A | 2/1969 | Laridon et al. | |
| 3,479,185 A | 11/1969 | Chambers, Jr. | |
| 3,549,367 A | 12/1970 | Chang et al. | |
| 4,162,162 A | 7/1979 | Dueber | |
| 5,540,033 A | 7/1996 | Fox et al. | |
| 5,622,168 A | 4/1997 | Keusch et al. | |
| 5,868,136 A | 2/1999 | Fox et al. | |
| 6,316,119 B1 | 11/2001 | Metzger et al. | |
| 6,777,165 B1 * | 8/2004 | Park et al. ............... | 430/286.1 |
| 2003/0171497 A1 | 9/2003 | Coca et al. | |

FOREIGN PATENT DOCUMENTS

| | | | |
|---|---|---|---|
| JP | 0312551 | * | 11/1990 |
| SU | 3671973 | * | 12/1983 |
| WO | WO 97/02811 | | 1/1997 |
| WO | WO 00/45698 | | 8/2000 |

* cited by examiner

*Primary Examiner*—Tae H. Yoon

(57) ABSTRACT

The present invention provides a screen printable hydrogel composition comprising: (a) soluble or partially soluble polymer wherein said polymer is a copolymer, interpolymer or mixture thereof; (b) initiation system; (c) thickener; (d) water; and (e) solvent; with the proviso that the composition has a viscosity of greater than about 10 Pa·s.

10 Claims, No Drawings

SCREEN PRINTABLE HYDROGEL FOR MEDICAL APPLICATIONS

FIELD OF THE INVENTION

This invention relates to a hydrogel composition, its associated screen-printable application process, and the use of the hydrogel composition in the formation of medical electrodes.

BACKGROUND OF THE INVENTION

Hydrogel films (which usually contain greater than 50% water) are useful in many medical applications due to their hydrophilic, or water loving nature, and their ability to act as a conductive member interfacing with the skin of a patient (electrode applications). Typical medical applications involving the use of hydrogels include contact lenses, wound dressings, transcutaneous electrical nerve stimulator (TENS) units, electro-surgical units (ESU's), EKG/EEG applications, iontophoresis, and artificial muscles, artificial organs, and prosthetics. The most widely used polymer in hydrogel formation, especially in medical applications such as implants, blood bags, and syringes, is poly(hydroxyethyl methacrylate).

While there are a variety of hydrogel compositions taught in the prior art which are utilized in medical applications, many of these compositions result in hydrogel films with significant disadvantages. Among the more significant disadvantages are issues associated with monomer-based hydrogel solutions and current hydrogel film production methods.

For example, many of the prior art compositions consist predominantly of a monomer and water solution. Associated with these unpolymerized monomers are strong odors which may be reduced after polymerization. However, because the monomers are not 100% converted, generally about 50% conversion takes place, some odors may remain. Also, these unpolymerized monomers may migrate to the surface of the hydrogel film and may be toxic.

Many prior art hydrogel compositions in current production are are cast and sold as films with release liners and are not suitable for screen printing. Typical hydrogel compositions disclosed in the prior art are applied in a sheet via a non-screen printing technology. The ability to screen print hydrogel compositions requires particular viscosity and shear thinning attributes. These attributes, which are required for screen printability, allow the ability to form a desired pattern and placement of desired dimensions of hydrogel composition in a precise manner. Prior art compositions are limited in ease of hydrogel film formation and processed hydrogel film thickness due to the rheology, shear thinning, and viscosity characteristics of the hydrogel composition. The rheology, shear thinning, and viscosity characteristics of the prior art compositions may lead to slower process times, extensive yield loss, and minimal control over ultimate hydrogel film thickness.

As discussed above, numerous prior art patents exist which disclose hydrogel compositions and medical electrodes utilizing the hydrogel films formed from those compositions. The following illustrate the state of the prior art.

U.S. Pat. No. 5,540,033 to Fox et al., teaches a method for producing a sterile packaged adhesive hydrogel product by preparing an aqueous mixture of water, a polymer which can be cross-linked by radiation (electron beam not UV light) to form a hydrogel, and a cross-linking inhibitor in an amount sufficient to retard the cross-linking of the polymer when the mixture is exposed to radiation; providing the mixture in a predetermined shape or configuration representative of a hydrogel product; enclosing the shaped mixture in a sealed package; and subjecting the package to a dose of radiation sufficient to simultaneously cross-link and sterilize the mixture to provide a sterile packaged adhesive hydrogel product. Fox et al., teaches a providing step which comprises casting the mixture onto a substrate in the desired shape and at a thickness of between about 20 and 100 mils. A scrim is typically applied to the cast mixture when the thickness of the cast mixture is greater than about 25–30 mils.

U.S. Pat. No. 5,868,136 to Fox et al., discloses an electrode providing electrical contact with a patient's skin comprising; a conductive member including means for connection to an external electrical apparatus; and means for electrically interfacing to said patient's skin being electrically and mechanically connected to said conductive member, said interfacing means being a non-liquid film and which comprises an electrically conductive organic polymer plasticized with a polyhydric alcohol with said organic polymer being derived from a monomeric mixture comprising from about 15 to 30 pph acrylic acid, 0.5 to 30 pph N-vinylpyrrolidone and 0.01 to 2 pph of a crosslinking agent and from about 0.5 to 8 pph of a thickening agent comprising a N-vinylpyrrolidone/acrylic acid copolymer. Fox et al., disclose an interfacing film thickness in a range 20 and 100 mils.

U.S. Pat. No. 5,622,168 to Keusch et al., teaches a highly conductive hydrophilic gel comprising a uniform aqueous solution of a crosslinked water-soluble polymer, an amount of a water-soluble electrolyte effective to reduce the transverse electrical resistance of said aqueous mixture to an impedance at 60 Hz less than about 1,000 ohm, which hydrophilic gel also contains a humectant in an amount effective to retard the drying of the conductive hydrophilic gel when it is exposed to the atmosphere while being used. A physiological electrode adapted for providing electrical contact with a surface of a sentient creature and comprising a sheet of the conductive viscoelastic hydrophilic gel. Keusch et al., teaches the use of the hydrophilic gel in an electrode by the following process: 1) casting the aqueous mixture to form a sheet-like configuration (liquid film thickness of 0.1 to 2 mm before crosslinking); 2) subjecting the liquid film to a dose of high energy radiation sufficient to convert said film into a solid gel; 3) optionally cutting the hydrogel sheet to the desired size and shape for use as a conductive element; and 4) placing the solid gel onto the electrode.

WO 97/02811 to Abraham et al., discloses a hydrogel patch, comprising: (a) a hydrophilic compound which forms a gel in the presence of water, which compound is present in an amount of about 4% or more by weight based on the weight of the hydrogel; (b) water in an amount of about 95% or less based on the weight of the hydrogel; (c) and enzyme capable of catalyzing a reaction; and (d) electrolyte. Abraham et al., teaches the casting of the hydrogel composition via a Gardner knife.

WO 00/45698 to Heard et al., discloses an electrode providing electrical contact with a patient's skin which includes a conductive member adapted for connection to an external electrical apparatus, a non-liquid film for electrically interfacing to the patient's skin, the non-liquid film being electrically, and mechanically connected to the conductive member. The non-liquid film includes an electrically conductive organic polymer plasticized with a polyhydric alcohol with said organic polymer being derived from a monomeric mixture comprising from about 15 pph to 30 pph acrylic acid, 0.5 pph to 30 pph N-vinyl pyrrolidine and 0.01 pph to 2 pph of a crosslinking agent. The monomeric mixture may further comprise from about 0.5 pph to 8 pph of a thickening agent selected from the group consisting of N-vinyl pyrrolidine/acrylic acid copolymers and N-vinyl pyrrolidine/vinyl acetate:

Considering the disadvantages of the prior art detailed above, a need therefore exists for a novel hydrogel composition and process which overcomes these disadvantages. Therefore, an objective of this invention is to provide a screen-printable hydrogel composition and process which allows for the ability to form a desired pattern and for placement of desired dimensions of the gel directly onto a substrate with little to no yield loss and control over the ultimate thickness. A further object of the invention is to provide a hydrogel composition which does not have a strong odor prior to processing.

SUMMARY OF THE INVENTION

The present invention provides a screen printable hydrogel composition comprising: (a) a soluble or partially soluble polymer wherein said polymer is a copolymer, interpolymer or mixture thereof; (b) initiation system; (c) thickener; (d) water; and (e) solvent; with the proviso that the composition has a viscosity of greater than about 10 Pa·s.

The present invention further provides a method of producing a processed hydrogel film comprising the steps of: (a) providing a screen printable hydrogel composition; (b) providing a substrate; (c) depositing the composition in (a) onto said substrate via screen printing techniques; and (d) processing said composition on said substrate to form a hydrogel film. Furthermore, the present invention provides a hydrogel film formed by the method above.

The present invention also provides an electrode utilizing the disclosed hydrogel composition and an electrode utilizing the hydrogel film formed by the method above.

DETAILED DESCRIPTION OF THE INVENTION

Unless otherwise indicted, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The novel hydrogel composition of the present invention simultaneously overcomes numerous disadvantages prominent in the prior art, including (1) strong monomer odor, (2) processing method of hydrogel film and electrode formation, and (3) poor adhesion characteristics.

The solution to the problem of strong odors asssociated with unpolymerized monomers of the prior art is overcome by replacing predominantly monomer solutions with a solution of predominantly functional polymer and water. Small amounts of monomer may be utilized in the present invention to enhance crosslinking, but the monomer is not required in the present invention. The level of monomer that may be utilized in the composition of the present invention results in minimal monomer odor during processing of the composition.

Furthermore, the hydrogel composition of the present invention may be screen-printed and processed using screen-printing techniques, which allow for the formation of a hydrogel film reflecting the pattern of the screen design. In order to screen print the composition, certain viscosity and sheer thinning charateristics are required. The composition of the present invention achieves a viscosity of above about 10 Pa·s and shear thinning characteristics suitable to screen-printing (which are detailed below). This allows placement of desired dimensions of the gel directly onto a substrate, for example and electrode, with little to no yield loss and precise control over the ultimate thickness. The present composition yields a hydrogel with a thickness from about 1–25 mils.

As many other types of compositions used in the formation of an electrode are already screen printed, the method of the present invention allows manufacturers of electrodes to easily apply hydrogel compositions in the same manner onto these electrodes in desired dimensions. Also, the composition of the present invention allows for a system that may be cured using standard UV industry technology. This allows for quicker, cheaper processing by reducing yield loss during manufacturing and eliminating separate off-line formation of the hydrogel film.

Additionally, the hydrogel of the present invention does not require the use of additional gels or pastes to produce a sufficiently tacky product which adheres to skin and ensures good electrical contact between the measuring electrode and the skin. This decreases electrode cost and production time.

The main components of the hydrogel composition will be discussed herein below.

I. Organic Viscoelastic Polymer

The polymer binder is important to the compositions of this invention. The polymer component of the present invention allows the hydrogel to conform to uneven surfaces and helps to provide tackiness. For example, the polymer of the present invention may be a viscoelastic polymer. Additionally, the polymers are soluble or partially soluble in water. They become a hydrogel film after an initiation system is introduced to the total composition.

The preferred polymers of the present invention are photocrosslinkable polymer binders. The preferred polymers are described in detail below. They are made of copolymer, interpolymer or mixtures thereof, wherein each copolymer or interpolymer comprises (1) a nonacidic comonomer comprising a $C_{1-10}$ alkyl acrylate, $C_{1-10}$ alkyl methacrylate, styrenes, substituted styrenes or combinations thereof and (2) an acidic comonomer comprising ethylenically unsaturated carboxylic acid containing moiety, wherein 2–25% of the carboxylic acid containing moiety is reacted with a reactive molecule having a first and second functional unit, wherein the first functional unit is a vinyl group and the second functional unit is capable of forming a chemical bond by reaction with the carboxylic acid moiety. Examples of the vinyl group include, but are not limited to methacrylate and acrylate groups. Examples of the second functional unit include, but are not limited to epoxides, alcohols and amines. The reacted portion of acidic comonomers became the third comonomer units (3) in the polymer. The fourth comonomer (4) is a nonacidic comonomer comprising C1–10 alkyl or alkoxy methacrylate or acrylate. The resultant copolymer, interpolymer or mixture thereof has an acid content of at least 10 wt. % of the total polymer weight; a glass transition temperature of 5–80° C., preferably 5–40° C., and an weight average molecular weight in the range of 2,000–250,000 and all ranges contained within. The resultant copolymer, interpolymer or mixture can further react with bases, such Na2CO3 or K2CO3 to convert its methacrylic or acrylic acid units into its salt form. This resulting salt has the capability to absorb more water.

The presence of acidic comonomer components in the composition is important in this technique. The acidic functional group provides the ability to be partially water soluble, to be able to become salt and be completely soluble. Furthermore, these acid units provide reactive sites for the introduction of UV-crosslinkable units. Appropriate acidic comonomers include ethylenically unsaturated monocarboxylic acids such as acrylic acid, methacrylic acid, or crotonic acid and ethylenically unsaturated dicarboxylic acids such as fumaric acid, itaconic acid, citraconic acid, vinyl succinic acid, and maleic acid, as well as their hemiesters, and in some cases their anhydrides and their mixtures.

When the nonacidic comonomers (1) and (4) are alkyl acrylates or alkyl methacrylates as mentioned above, it is preferable that these nonacidic comonomers constitute at least 50 wt. %, preferably 70–75 wt. %, of the polymer binder. When the nonacidic comonomers are not acrylates, it is preferable that these nonacidic comonomers constitute 50 wt. % of the polymer binder and that the other 50 wt. % is an acid anhydride such as the hemiester of maleic anhydride.

The nonacidic portion of the polymer binder needs to contain at least 10 wt. % of nonacidic comonomer that are long chain (C5 and above) alkyl acrylate, alkyl methacrylate, or alkoxyl acylate or alkoxyl methacrylate to achieve good adhesion to skin after UV-crosslinking. These comonomer units help to lower the $T_g$ of the polymer and are hydrophilic. The use of single copolymers or combinations of copolymers as binders are recognized as long as each of these satisfies the various standards above. In addition to the above copolymers, adding small amounts of other polymer binders is possible. For examples of these, polyolefins such as polyethylene, polypropylene, polybutylene, polyisobutylene, and ethylene-propylene copolymers, polyvinyl alcohol polymers (PVA), polyvinyl pyrrolidone polymers(PVP), vinyl alcohol and vinyl pyrrolidone copolymers, as well as polyethers that are low alkylene oxide polymers such as polyethylene oxide can be cited.

The acidic comonomer also provides the polymer with a reactive site to introduce a reactive molecule such as photocrosslinkable functional units. This is accomplished by utilizing 2–25% of the carboxylic acid containing moiety reacting with the reactive molecule that contains a vinyl unit, as shown in the schematic below. The final polymer has repeating units, as shown. These polymers are well known to those skilled in the art.

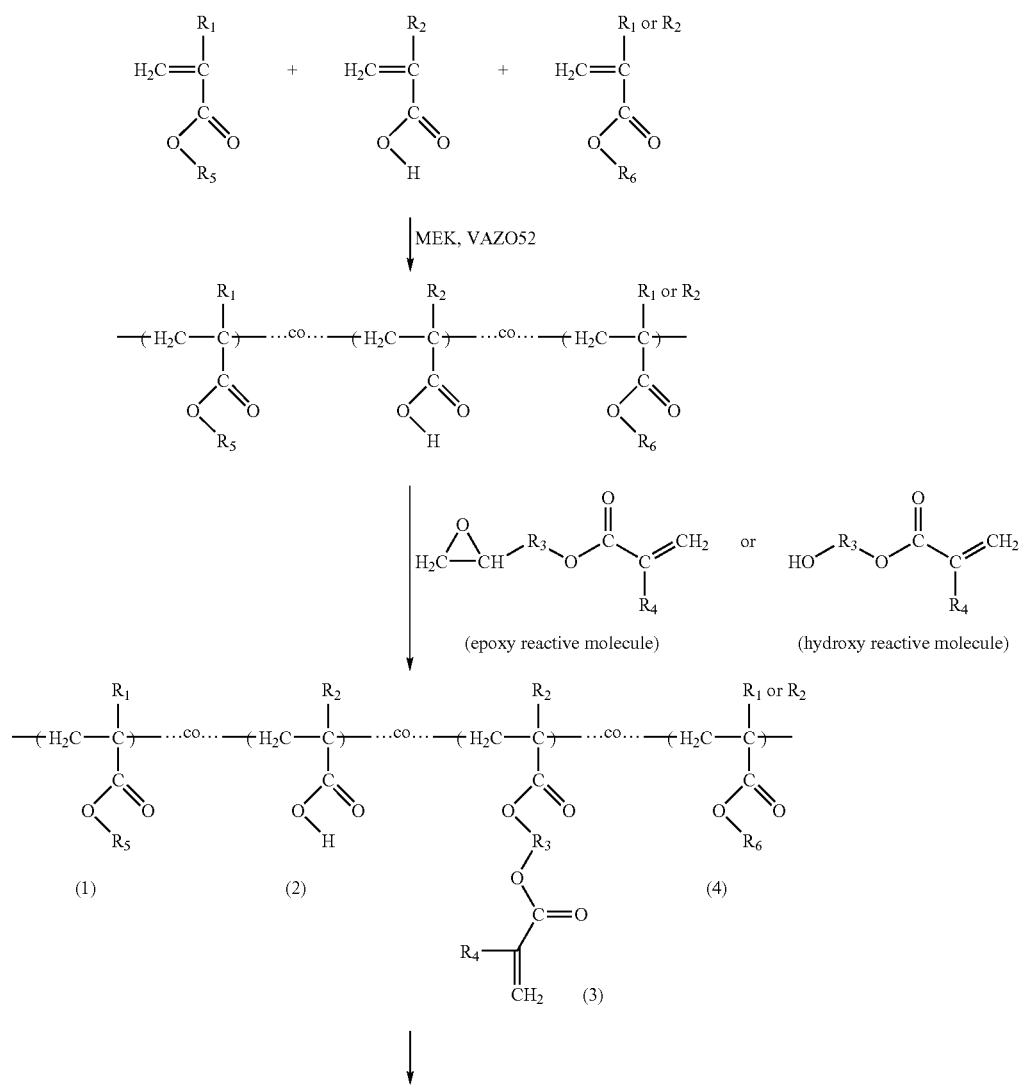

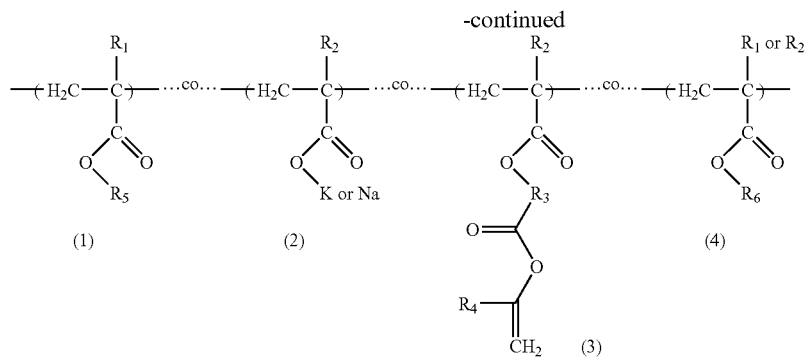

Where:
$R_1$, $R_2$ and $R_4$ are methyl group or hydrogen or a mixture thereof;

$R_3$ is a straight, branched or ring alkyl group which may contain aromatic groups or other atoms, for example, oxygen; and $R_5$ is an alkyl ($C_1$–$C_{10}$).

R6 is an alkoxyl (C1–C10).

The polymers described herein can be produced by those skilled in the art of acrylate polymerization by commonly used solution polymerization techniques. Typically, such acidic acrylate polymers are produced by mixing alpha- or beta-ethylenically unsaturated acids (acidic comonomers) with one or more copolymerizable vinyl monomer (nonacidic comonomers) in a relatively low-boiling-point (75–150° C.) organic solvent to obtain a 10–60% monomer mixture solution, then polymerizing the monomers by adding a polymerization catalyst and heating the mixture under normal pressure to the reflux temperature of the solvent. After the polymerization reaction is essentially complete, the acidic polymer solution produced is cooled to room temperature.

A reactive molecule, a free radical polymerization inhibitor and a catalyst are added to the cooled polymer solution described above. The solution is stirred until the reaction is complete. Optionally, the solution may be heated to speed up the reaction. After the reaction is complete and the reactive molecules are chemically attached to the polymer backbone, the polymer solution is cooled to room temperature, samples are collected, and the polymer viscosity, molecular weight, and acid equivalents are measured.

Furthermore, the weight average molecular weight of the polymer binder is in the range of 2,000–250,000 and any ranges contained therein. The molecular weight of the polymer binder will depend on the application. Weights less than 10,000 are generally useful in paste compositions and above 10,000 are generally useful in tapes or sheets. Polymers with molecular weight less than 10,000, generally have lower film forming ability. They may be used in tape formulations but generally require mixing with other compatible high molecular weight polymers to form a film or tape.

Conventional UV-curable methacrylate monomers may be used in the invention. Depending on the application, it is not always necessary to include a monomer in the composition of the invention. Monomer components are present in amounts of 0–20 wt. %, based on the total weight of the dry photopolymerizable layer. Such preferred monomers include t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethyacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, 2,2-di(p-hydroxy-phenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di-(p-hydroxyphenyl)propane dimethacrylate, di-(3-methacryloxy-2-hydroxypropyl)ether of bisphenol-A, di-(2-methacryloxyethyl) ether of bisphenol-A, di-(3-acryloxy-2-hydroxypropyl)ether of bisphenol-A, di-(2-acryloxyethyl)ether of bisphenol-A, di-(3-methacrloxy-2-hydroxypropyl)ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a weight average molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of free radical polymerizable ethylenic linkages particularly when present as terminal linkages. In several embodiments, the monomers which are used are polyoxyethylated trimethylolpropane triacrylate, ethylated pentaerythritol triacrylate, dipentaerythritol monohydroxypentaacrylate and 1,10-decanediol dimethacrylate.

The total wt % of polymer, monomer and mixtures thereof in the composition is in the range of about 5–35 wt. % based on total composition and any ranges contained therein. The monomer in the composition is present in an amounts of less than about 5 wt. %, based on total composition.

II. Initiation System

Initiation systems which are suitable to the present invention include thermal initiation, redox initiation, photoinitiation, initiation by ionizing radiation, electroinitiation, and plasma initiation. The preferred initiation system is photoinitiation.

Suitable photoinitiation systems are those, which generate free radicals upon exposure to actinic light at ambient temperature. These include the substituted or unsubstituted polynuclear quinones which are compounds having two intracyclic carbon atoms in a conjugated carbocyclic ring system, e.g., 2-benzyl-2-(dimethylamino)-1-(4-morpholinophenyl)-1-butanone, 2,2-dimethoxy-2-phenylacetophenone, 9,10-anthraquinone, 2-methylanthraquinone, 2-ethylanthraquinone, 2-tert-butylanthraquinone, octamethylanthraquinone, 1,4-naphthoquinone, 9,10-phenanthrenequinone, benz(a)anthracene-7,12-dione, 2,3-naphthacene-5,12-dione, 2-methyl-1,4-naphthoquinone, 1,4-dimethylanthraquinone, 2,3-dimethylanthraquinone, 2-phenylanthraquinone, 2,3-diphenylanthraquinone, retenequinone, 7,8,9,10-tetrahydronaphthracene-5,12-dione, and 1,2,3,4-tetra-hydrobenz(a)anthracene-7,12-dione. Other photoinitiators which are also useful, even though some may be thermally active at temperatures as low as 85° C., are described in U.S. Pat. No. 2,760,863 and include vicinal ketaldonyl alcohols such as benzoin, pivaloin, acyloin ethers, e.g., benzoin methyl and ethyl ethers; alpha-hydrocarbon-substituted aromatic acyloins, including alpha-methylbenzoin, alpha-allylbenzoin and alpha-phenylbenzoin, thioxanthone and/or thioxanthone derivatives and the appropriate hydrogen donors. Photoreducible dyes and reducing agents disclosed in U.S. Pat. Nos. 2,850,445, 2,875,047, 3,097,096, 3,074,974, 3,097,097, and 3,145,104, as well as dyes of the phenazine, oxazine, and quinone classes, Michler's ketone, benzophenone, 2,4,5-triphenylimidazolyl dimers with hydrogen donors including leuco dyes and mixtures thereof as described in U.S. Pat. Nos. 3,427,161, 3,479,185, and 3,549,367 can be used as initiators. Also useful with photoinitiators and photoinhibitors are sensitizers disclosed in U.S. Pat. No. 4,162,162. The photoinitiator or photoinitiator system is present in 0.05 to 10% by weight based on the total weight of a dry photopolymerizable layer.

III. Thickening Agent

"Thickening agent" as used herein, refers to any substance that increases the viscosity and/or thixotropy of fluid dispersions or solutions. The thickening agent may also be a water-swellable component that may also act as a strengthening agent and/or conductive filler. Thickening agents suitable to the present invention include, but are not limited to: Polyvinyl pyrrolidone (PVP K90, ISP Technologies, Inc.); Fumed Silica (Cab-o-sil®, Cabot Corporation); Polyclar® V, ISP Technologies, Inc.; Aculyn®, ISP Technologies, Inc.; Polyethylene oxide (PEO 5MM, Polysciences, Inc.); Carboyximethyl cellulose (Aldrich); Polyvinyl pyrrolidone/vinyl acetate copolymer (PVP/VA, S-630, ISP Technologies, Inc.); Kelgin® (ISP Technologies, Inc.); talc; and glass beads.

IV. Solvent

The solvent component of the organic medium, which may be a mixture of solvents, is chosen so as to obtain complete solution therein of the polymer and other organic components. The solvent of the present invention is required in an amount necessary to obtain complete solution of the polymer and other organic components. The solvent should be inert (non-reactive) towards the other constituents of the composition. Such solvents include aliphatic alcohols, esters of such alcohols, for example, acetates and propionates; terpenes such as pine oil and alpha- or beta-terpineol, or mixtures thereof; ethylene glycol and esters thereof, such as ethylene glycol monobutyl ether and butyl cellosolve acetate; carbitol esters, such as butyl carbitol, butyl carbitol acetate and carbitol acetate and other appropriate solvents such as Texanol® (2,2,4-trimethyl-1,3-pentanediol monoisobutyrate). Other suitable solvent(s) have lower boiling points, such solvents include ethylacetate, methanol, isoproanol, acetone, xylene, ethanol, methylethyl ketone and toluene.

V. Optional Additional Additives of Hydrogel Composition

Additional additives such as, ionic components, biocides, preservatives, humectants, surfactants, and adhesion promoters, can be included in the hydrogel composition to achieve desired properties. A brief description of some possible additives is provided below.

"Ionic component", as used herein, refers to an atom, radical, or molecule that is capable of being electrically charged, either negatively (anionic) or positively (cationic) or both (amphoteric), or to a material whose atoms already exist in a charged state. The ionic components of the present invention are added to reduce the transverse electrical resistance. For example, the ionic components of the present invention may include salts (anionic, cationic, or anions of organic acids), buffers, and/or ionic polymers or polyelectrolytes.

"Biocide" as used herein, refers to an agent, incorporated or applied, that may destroy or deter biological material, including but not limited to bacteria, fungi, mold, and marine organisms. Biocides may be used in the present invention to destroy or deter biological material growth which may be promoted due to the aqueous environment. For example, biocides including, but not limited to high-energy radiation, Germ-all® (ISP Technologies, Inc.), and Irgasan® (Ciba Specialty Chemicals), may be used in the present invention.

"Preservative" as used herein, refers to a chemical, incorporated or applied, to prevent deterioration by means including, but not limited to living organisms, heat, oxidation, and weather.

"Humectant" as used herein, is any substance that promotes retention of moisture. For example, sorbitol, propylene glycol, glycerol, polyethylene glycol, poly(propylene oxide), or combinations thereof may be used in the present invention, among other humectants known to those skilled in the art. Preferably, the humectant used in the present invention is biocompatible.

"Surfactant" as used herein, is any substance that modifies the surface tension. For example, the following surfactants, as well as others known to those skilled in the art, may be used in the present invention: Pluronic® P85 (BASF), Pluronic® P84 (BASF), Tween® 80 (Aldrich), Sodium Dodecyl Sulfate (Aldrich), Amphosol® CG, Amphosol® HCG, Ninol® LL (Stepan Corporation), Glycerol (Aldrich), sodium laureth sulfate, and poly ethylene glycol esters.

"Adhesion promoter" as used herein, is a material that may be added to the hydrogel composition to improve adhesion of the processed hydrogel film to the desired substrate.

VI. Production of Processed Hydrogel Film and Electrode

The hydrogel compositions as described herein may be utilized to create a processed hydrogel film. Once the hydrogel composition is prepared to form a composition having suitable consistency and rheology for screen printing, the composition is then printed on a substrate in the conventional manner as known to those in the art of screen printing techniques. The composition may be screen printed to a desired pattern reflecting the pattern of the screen design.

The viscosity of the hydrogel composition is typically within the following ranges when measured on a Brookfield 1/2RVT viscometer at low, moderate and high shear rates:

| Shear Rate (sec$^{-1}$) | Viscosity (Pa * s) | |
| --- | --- | --- |
| 0.2 | 30–1250 | |
| | 30–500 | Preferred |
| | 30–100 | Most Preferred |
| 4 | 8–62 | |
| | 10–40 | Preferred |
| | 15–30 | Most Preferred |
| 20 | 2–31 | |
| | 3–20 | Preferred |
| | 5–10 | Most Preferred |

The hydrogel film of the present invention may be formed by the method comprising the steps of: (1) providing the hydrogel composition as described herein above; (2) providing a substrate; (3) depositing the composition in (1) onto the substrate via screen printing techniques; and (4) processing said composition on said substrate to form a hydrogel film.

Furthermore, the substrate of the hydrogel film forming method described above may be an electrode. Thus, the hydrogel film is formed directly onto the electrode in the precise location and dimensions desirable. This electrode may then be used in medical applications wherein the hydrogel film is sufficiently tacky to adhere to a patient's skin.

Because the hydrogel film of the present invention will eventually lose solvent under ambient conditions, they are preferably stored in a water and gas impermeable container. If the hydrogel is printed and formed to the desired shape and stored separately from the electrode with which it is to be used, both surfaces are preferably covered with a peelable release layer. If the hydrogel is to be stored as printed and mounted directly to the electrode with which it is to be used, its exposed surface, or the surface to be applied to the skin, is preferably covered with a peelable release layer. The release layer utilized may be any known to those skilled in the art, for example, but not limited to, a polyethylene or polyester layer may be utilized.

EXAMPLES

The invention will now be described in further detail by reference to the following, non-limiting examples.

Example 1

Production of Photocrosslinkable Polymer

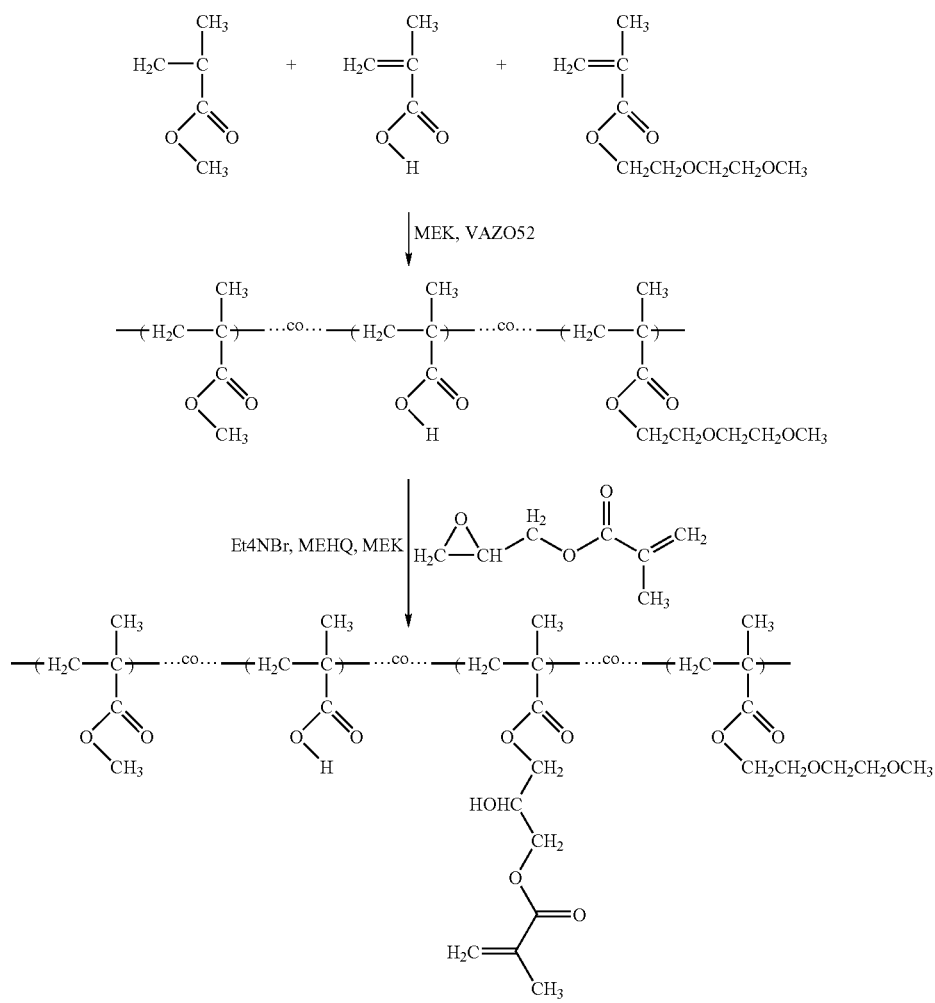

Procedure:
1) Into a 1 L flask equipped with a nitrogen gas inlet and mechanical stirrer, 200 grams of methylethylketone (MEK) was added and heated under nitrogen gas to reflux;
2) A mixture of 35 grams di(ethylene glycol)methyl ether methacrylate, 40 grams of methyl methacrylate, 25 grams of methacrylic acid and 150 grams MEK was continuously added into the above 1 L flask at a constant speed over a period of 120 minutes, using pump#1;
3) A mixture of 6 grams VAZO52 and 26 grams MEK was continuously added into the above 1 L flask over a period of 140 minutes, using pump#2. The two pumps started at the same time. During the addition, the reaction mixture was stirred at reflux temperature under nitrogen gas.
4) Continue to stir at reflux temperature for 120 minutes after the addition;
5) Cool the above reaction mixture to 60 C, 200 grams MEK was added. The temperature was kept at 55 C, and 1 gram 4-methoxyhydroquinone(MEHQ) was added;
6) Then, 1 gram tetraethylammonium bromide was added, followed by addition of 13.75 grams glycidyl methacrylate;
7) The mixture was stirred at 58 C for 24 hours. Then solvent was removed by evaporation and the mixture was dried at 50 C under vacuum for 12 hours;
8) All materials were used as received from Aldrich except VAZO52 from DuPont.

Example 2

Hydrogel Composition #1

| | |
|---|---|
| 1. Thickening Agent (Polyethylene oxide) (PEO) (MW 2MM) | 2.3% |
| 2. $H_2O$ | 57.7% |
| 3. Surfactant (Pluronic ® P84) | 2.6% |
| 4. Ionic Component (NaCl) | 0.6% |
| 5. Polymer (Methyl methacrylate-co-methacyrlic acid-co-UV-polymerizable group) | 16.0% |
| 6. Solvent (Carbitol Acetate) | 19.1% |
| 7. Photoinitiator (Irgacure 369) | 0.3% |
| 8. Difunctional Monomer (Polyethylene glycol dimethacrylate (PEGDMA)) | 1.4% |

In a 100 ml jar, 1.6 g of thickening agent [polyethylene oxide (MW 2MM)] was combined with 40.4 g of water for 2 minutes then rolled overnight to produce a dissolved solution. To the dissolved solution, 1.8 g of the surfactant (Pluronic® P84, BASF) was added and stirred by hand until dissolved, about 5 minutes. To that solution, 0.4 g of ionic component (Sodium Chloride, J T Baker) was added and mixed by hand for about 2 minutes until dissolved. Separately, in a 100 ml beaker, 11.2 g of the polymer (Methyl methacrylate-co-methacyrlic acid-co-UV-polymerizable group), produced according to the methodology above, was added in 20% increments with 1 hour of mixing after each addition at 50° C. in 13.4 g of solvent (Carbitol Acetate, Eastman Chemical). After all additions, the final solution was stirred overnight at 50° C. 0.2 g of photoinitiator (Irgacure 369, Ciba) was added to the polymer solution and mixed by hand until dissolved, about 2 minutes. Lastly, the two solutions were combined, and 1.0 g of PEGDMA was added. The resulting solution was stirred vigorously for 5 minutes.

Hydrogel composition #1 resulted in a composition suitable for screen printing. The resulting composition was screen printed, exposed to UV-radiation using a Hg-vapor lamp until sufficiently cured. This processing resulted in a tacky hydrogel film.

Key:
1. PEO=Polyethylene oxide (MW 2MM), Polysciences, Inc.
3. Surfactant, to make a homogeneous mixture, BASF
4. Ionic component—Sodium Chloride, JT Baker
5. Polymer=Methyl methacrylate-co-methacyrlic acid-co-UV-polymerizable group
6. Carbitol Acetate, Eastman Chemical
7. Irgacure 369, Ciba
8. PEGDMA=Polyethylene glycol dimethacrylate, Aldrich Example 3

Hydrogel Composition #2

| | |
|---|---|
| 1. $H_2O$ | 60.6% |
| 2. Thickening Agent (PEO) (5MM) | 1.9% |
| 3. Polymer (Methyl methacrylate-co-methacyrlic acid-co-UV-polymerizable group) | 16.9% |
| 4. Solvent (Carbitol acetate) | 14.8% |
| 5. Photoinitiator (Irgacure 369) | 0.2% |
| 6. Ionic Component (NaCl) | 0.5% |
| 7. Difunctional Monomer (PEGDMA, Aldrich) | 1.5% |
| 8. Trifunctional Monomer ((Trimehtylolpropane triacrylate (TMPTA), UCB Chemical Corp) | 1.0% |
| 9. Surfactant (Pluronic ® P84, BASF) | 2.6% |

In a 100 ml jar, 0.6 g of thickening agent [polyethylene oxide (MW 5MM)] was combined with 20.6 g of water for 2 minutes then rolled overnight to produce a dissolved solution. To the dissolved solution, 0.8 g of the surfactant (Pluronic® P84, BASF) was added and stirred by hand until dissolved, about 5 minutes. Next, 0.2 g of ionic component (Sodium Chloride, JT Baker) was added and mixed by hand for about 2 minutes until dissolved. Separately, in a 100 ml beaker, 5.7 g of the polymer (Methyl methacrylate-co-methacyrlic acid-co-UV-polymerizable group), produced according to the methodology above, was added in 20% increments with 1 hour of mixing after each addition at 50° C. in 5.0 g of solvent (Carbitol Acetate, Eastman Chemical). After all additions, the final solution was stirred overnight at 50° C. 0.07 g of photoinitiator (Irgacure 369, Ciba) was added to the polymer solution and mixed by hand until dissolved, about 2 minutes. Lastly, the two solutions were combined, and 0.5 g of PEGDMA and 0.3 g. of TMPTA were added. The resulting solution was stirred vigorously for 5 minutes.

Example 4

Hydrogel Composition #3

| | |
|---|---|
| 1. Thickener (Polyvinylpyrrolidone (K-90), ISP Technologies) | 6.5% |
| 2. $H_2O$ | 49.4% |
| 3. Polymer (Methyl methacrylate-co-methacyrlic acid-co-UV-polymerizable group) | 21.4% |
| 4. Photoinitiation System (Irgacure 369) | 0.3% |
| 5. Solvent (Carbitol Acetate) | 18.8% |
| 6. Ionic Component (NaCl) | 0.6% |
| 7. Humectant (Glycerol (Aldrich)) | 3.0% |

In a 100 ml jar, 0.7 g of thickener (Polyvinylpyrrolidone (K-90), ISP Technologies) was combined with 0.5 g of water for 2 minutes then rolled overnight to produce a dissolved solution. Next, 0.07 g of ionic component (Sodium Chloride, JT Baker) was added and mixed by hand for about 2 minutes until dissolved. Separately, in a 50 ml beaker, 2.4 g of the polymer was added in 20% increments with 1 hour of mixing after each addition at 50° C. in 2.2 g of solvent (Carbitol Acetate, Eastman Chemical). After all additions, the final solution was stirred overnight at 50° C., 0.03 g of photoinitiator (Irgacure 369, Ciba) was added to the polymer solution and mixed by hand until dissolved, about 2 minutes. Lastly, the two solutions were combined, and 0.3 g of humectant (Glycerol (Aldrich)) was added. The resulting solution was stirred vigorously for 5 minutes.

Hydrogel composition #3 resulted in a composition suitable for screen printing. The resulting composition was screen printed, exposed to UV-radiation using a Hg-vapor lamp until sufficiently cured. This processing resulted in a tacky hydrogel film.

What is claimed is:

1. A screen printable hydrogel composition comprising:
   (a) A soluble or partially soluble polymer wherein said polymer is a photocrosslinkable polymer which is a copolymer, interpolymer or mixture thereof, wherein each copolymer or interpolymer comprises (1) a nonacidic comonomer comprising a $C_{1-10}$ alkyl acrylate, $C_{1-10}$ alkyl methacrylate, styrenes or combinations thereof; (2) an acidic comonomer and its salts comprising ethylenically unsaturated carboxylic acid containing moiety, wherein 2–25% of the carboxylic acid containing moiety is reacted with a reactive molecule having a first and second functional unit wherein the first functional unit is a vinyl group and the second functional unit is capable of forming a chemical bond by reaction with the carboxylic acid moiety; (3) third comonomer units formed from the reacted portion of acidic comonomers; and (4) a nonacidic comonomer comprising C1–10 alkyl or alkoxy methacrylate or acrylate;
   (b) initiation system;
   (c) thickener;
   (d) water; and
   (e) solvent;
   with the proviso that the composition has a viscosity of greater than about 10 Pa·s and
   wherein said composition is a screen printable hydrogel composition.

2. The composition of claim 1 wherein the vinyl group is selected from the group consisting of a methacrylate, acrylate group and mixtures thereof.

3. The composition of claim 1 wherein the second functional unit is selected from the group consisting of an epoxide, alcohol, amine and mixtures thereof.

4. The composition of claims 1–3 further comprising a monomer.

5. The composition of claim 4 wherein said monomer is selected from the group consisting of polyoxyethylated trimethylolpropane triacrylate, ethylated pentaerytbritol triacrylate, dipentaerythritol monohydroxypentaacrylate, 1,10-decanediol dimethlacrylate and mixtures thereof.

6. The composition of any claim 1 in which the solvent is selected from the group consisting of carbitol acetate, ethanol, methyl ethyl ketone, acetone, and mixtures thereof.

7. The composition of claim 1 wherein the thickener is selected from the group consisting of polyvinyl pyrrolidone, fumed silica, polyethylene oxide, carboyximethyl cellulose, polyvinyl pyrrolidone/vinyl acetate copolymer, and mixtures thereof.

8. The composition of claim 1 further comprising an additive selected from the group consisting of humectants, surfactants, biocides, preservatives and combinations thereof.

9. The composition of claim 1 further comprising an ionic component.

10. The composition of claim 1 which is in the form of a paste suitable for screen printing.

* * * * *